United States Patent
Lee et al.

(10) Patent No.: US 12,006,661 B2
(45) Date of Patent: Jun. 11, 2024

(54) ENVIRONMENT COGNITION SYSTEM FOR CONSTRUCTION MACHINERY

(71) Applicant: HD HYUNDAI INFRACORE CO., LTD, Incheon (KR)

(72) Inventors: Heejin Lee, Incheon (KR); Dongmok Kim, Incheon (KR); Heeseung Hong, Suwon-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 838 days.

(21) Appl. No.: 16/952,541

(22) Filed: Nov. 19, 2020

(65) Prior Publication Data

US 2021/0148089 A1    May 20, 2021

(30) Foreign Application Priority Data

Nov. 19, 2019    (KR) .................. 10-2019-0148615

(51) Int. Cl.
  *E02F 9/26*    (2006.01)
  *G01S 7/481*   (2006.01)
  *G01S 17/89*   (2020.01)
(52) U.S. Cl.
  CPC ............ *E02F 9/261* (2013.01); *G01S 7/4811* (2013.01); *G01S 17/89* (2013.01)
(58) Field of Classification Search
  CPC ................... G01S 17/894; G01S 17/88; G01S 2013/93273; G01S 13/931; G01S 13/89; G01S 17/931
  See application file for complete search history.

(56) References Cited

U.S. PATENT DOCUMENTS

2021/0002863 A1 *   1/2021   Sakuta .................. E02F 9/2271

FOREIGN PATENT DOCUMENTS

| JP | 2016003520 A | | 1/2016 |
| WO | WO-2018099755 A1 | * | 6/2018 |
| WO | 2019189203 A1 | | 10/2019 |

OTHER PUBLICATIONS

Extended European Search Report dated Apr. 20, 2021, in connection with the counterpart European Patent Application No. EP20208533.8.

* cited by examiner

*Primary Examiner* — Yuqing Xiao
*Assistant Examiner* — Clara G Chilton
(74) *Attorney, Agent, or Firm* — Hauptman Ham, LLP

(57) ABSTRACT

An environment cognition system for construction machinery includes a first sensor installed on an upper surface of a cabin of the construction machinery to obtain shape information on a front ground, and a second senor installed on a lower surface of a boom of the construction machinery to obtain shape information data in an excavation area. The second sensor is installed in a region that does not overlap a trajectory of a circle drawn by an end of a bucket, with the arm folded as far as possible.

3 Claims, 4 Drawing Sheets

MEASUREMENT TARGET AREA

ENVIRONMENT COGNITION SYSTEM FOR CONSTRUCTION MACHINERY

PRIORITY STATEMENT

This application claims priority under 35 U.S.C. § 119 to Korean Patent Application No. 10-2019-0148615, filed on Nov. 19, 2019 in the Korean Intellectual Property Office (KIPO), the contents of which are herein incorporated by reference in their entirety.

BACKGROUND

1. Field

Example embodiments relate to an environment cognition system for construction machinery. More particularly, example embodiments relate to an environment cognition system having sensors capable of recognizing surrounding environment in a working process of construction machinery such as an autonomous excavator.

2. Description of the Related Art

An automated excavator system can perform excavation work by itself in a given environment. Unmanned excavators must have capability to generate optimal motion in a reliable and efficient manner. For example, in case of a sensor for grasping topography of an excavation area during the excavation work of the automated excavator, it may be necessary to select an optimal installation location to avoid interference with a boom, an arm a bucket and to have an optimal topographic resolution.

SUMMARY

Example embodiments provide an environment cognition system for construction machinery capable of minimizing measurement blind spots and providing accurate measurement results.

According to example embodiments, an environment cognition system for construction machinery includes a first sensor installed on an upper surface of a cabin of the construction machinery to obtain shape information on the front ground, and a second senor installed on a lower surface of a boom of the construction machinery to obtain shape information data in an excavation area. The second sensor is installed in a region that does not overlap a trajectory of a circle drawn by an end of a bucket, with the arm folded as far as possible.

In example embodiments, the second sensor may be installed in a region relatively close to a pin of the arm in the region.

In example embodiments, the first and second sensors may include a LiDAR (Light Detection And Ranging) sensor.

In example embodiments, the environment cognition system for construction machinery may further include a data processing device configured to collect and process data from the first and second sensors to provide surrounding environment data of the construction machinery.

According to example embodiments, a control system for construction machinery may monitor obstacles around an excavator in real time during unmanned operation, and may limit the movement of the excavator according to a distance to the obstacle to prevent collision with the obstacle. Accordingly, economic loss may be prevented when the obstacle is an object, and life accident may be prevented when the obstacle is a person or an animal.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Figure 1:
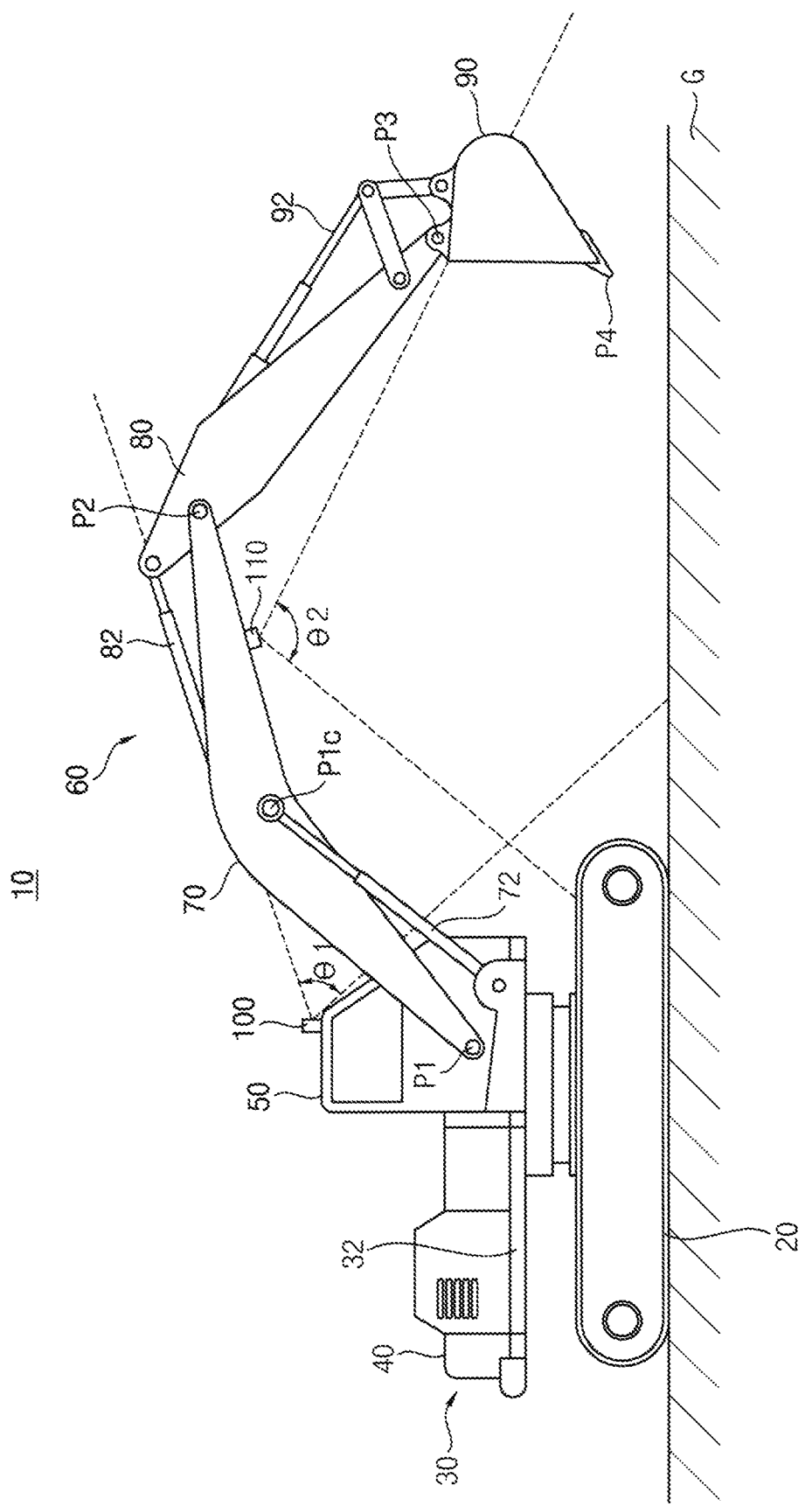
FIG. 1 is a side view illustrating construction machinery in accordance with example embodiments.

Hereinafter, example embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

Figure 2:
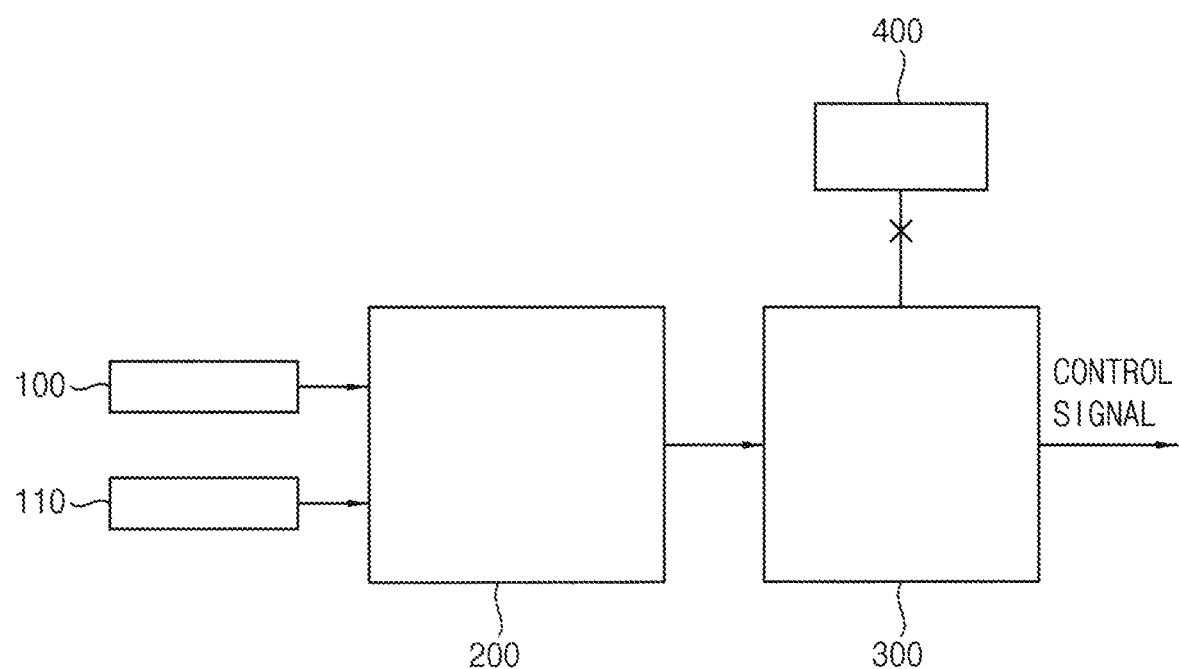
FIG. 2 is a block diagram illustrating a control system for construction machinery in FIG. 1.

FIG. 1 is a side view illustrating construction machinery in accordance with example embodiments. FIG. 2 is a block diagram illustrating a control system for construction machinery in FIG. 1.

Referring to FIGS. 1 and 2, construction machinery 10 may include a lower travelling body 20, an upper swinging body 30 mounted to be capable of swinging on the lower travelling body 20, and a cabin 50 and a front working device 60 installed in the upper swinging body 30.

The lower traveling body 20 may support the upper swinging body 30 and may travel the construction machine 10 such as an excavator using power generated from an engine 110. The lower traveling body 20 may be a caterpillar type traveling body including a caterpillar track. Alternatively, the lower traveling body 20 may be a wheel type traveling body including traveling wheels. The upper swinging body 30 may have an upper frame 32 as a base, and may rotate on a plane parallel to the ground on the lower traveling body 20 to set a working direction.

The cabin 50 may be installed on a left front side of the upper frame 32, and the working device 60 may be mounted on a front side of the upper frame 32. A counter weight 40 may be mounted at a rear of the upper frame 32, to stabilize the construction machine by equilibrating an external force when the construction machine performs the work of raising the load upward.

The front working device 60 may include a boom 70, an arm 80 and a bucket 90. The front working device 60 may be actuated by driving actuators such as a boom cylinder 72, an arm cylinder 82 and a bucket cylinder 92. In particular, the boom cylinder 72 for controlling a movement of the boom 70 may be installed between the boom 70 and the upper swinging body 30. The arm cylinder 82 for controlling a movement of the arm 80 may be installed between the arm 80 and the boom 70. The bucket cylinder 92 for controlling a movement of the bucket 90 may be installed between the bucket 90 and the arm 80. Additionally, a swing motor for controlling the upper swinging body 30 may be installed between the upper swinging body 30 and the lower travelling body 20. As the boom cylinder 72, the arm cylinder 82 and the bucket cylinder 92 expand or contract, the boom 70, the arm 80 and the bucket 90 may implement various movements, to thereby perform various works. Here, the boom cylinder 72, the arm cylinder 82 and the bucket cylinder 92 may be extended or contracted by a hydraulic oil supplied from a hydraulic pump.

Meanwhile, in addition to the bucket 90, various attachments may be attached to an end portion of the arm 80 according to the purpose of the work. For example, the bucket may be used for excavation or ground leveling, and a breaker (not illustrated) may be used to crush rocks or the like. In addition, a cutter may be used to cut scrap metal or the like.

In example embodiments, the construction machinery may include an excavator, a wheel loader, a forklift, etc. Hereinafter, it will be explained that example embodiments may be applied to the excavator. However, it may not be limited thereto, and it may be understood that example embodiments may be applied to other construction machinery such as the wheel loader, the forklift, etc.

As illustrated in FIG. 2, a control system for construction machinery may include an environment cognition system for construction machinery. The environment cognition system for construction machinery may include a plurality of sensors 100, 110 installed in the construction machinery, and a data processing device 200 configured to collect and process data from the sensors to provide surrounding environment data. The control system for the construction machine may further include a control device 300 configured to determine an area, a volume, or a path to be worked on based on the surrounding environment data, and a planning portion 400 configured to provide topographic information of a work terrain and work information for an automated work of the construction machine.

In order to perform an unmanned or automated operation of the excavator, the environment recognition system of the construction machine may recognize a work environment and detect surrounding objects including obstacles. To this end, the surrounding environment recognition system for construction machinery may include various sensors having a field of view (FoV) required for each function. In particular, the sensors may include a first sensor 100 installed on an upper surface of the cabin 50 and a second sensor 110 installed on a lower surface of the boom 70 of the front working device 60.

The first sensor 100 may be installed on the upper surface of the cabin 50 to obtain shape information data on the ground in the front of the excavator. The first sensor 100 may include a LiDAR (Light Detection And Ranging) sensor. The LiDAR sensor may be installed on the upper surface of the cabin 50 by a bracket. The LiDAR sensor may scan the front ground during a driving operation and a swing operation to obtain the shape information data and output to the data processing device 200.

While the excavator is moving, the first sensor may detect an obstacle to obtain topographic shape data. The obtained data may be used to determine whether the unmanned automated operation can be performed or not. In addition, point cloud data (PCD) obtained during the driving operation and the swing operation may be collected to be used to obtain information on the surrounding terrain environment.

The second sensor 110 may be installed on the lower surface of the boom 70 to obtain shape information data in an excavation area. The second sensor 110 may include a LiDAR sensor. The LiDAR sensor may be installed on the lower surface of the boom 70 by a bracket. The LiDAR sensor may scan the excavation area to obtain the shape information data and to output to the data processing device 200.

The first sensor may be located on the upper surface of the cabin 50 and may maintain a measurement direction in the forward direction to have a constant field of view (FoV). Thus, coordinate calculation may be simplified. However, in a flat or slope excavation operation, the resolution of the first sensor may decrease and a measurement blind spot may occur. The second sensor may be installed on the lower surface of the boom 70 to improve the resolution and minimize the occurrence of the blind spot in connection with the operation of the front working device 60. The point cloud data (PCD) acquired by the second sensor may be used for a work plan of an automated excavator such as an excavation work and a loading operation.

Hereinafter, an installation location of the second sensor will be explained.

Figure 3:
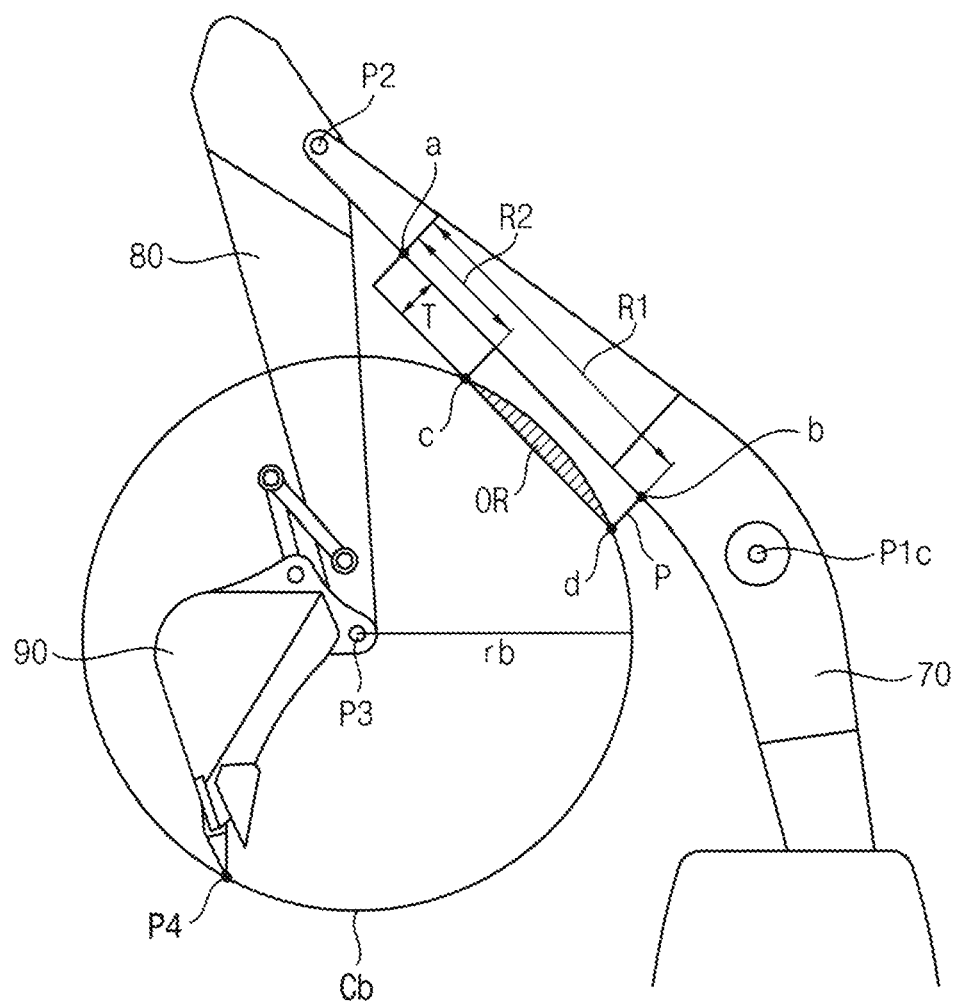
FIG. 3 is a side view illustrating an installation location of a second sensor in accordance with example embodiments.
Figure 4:
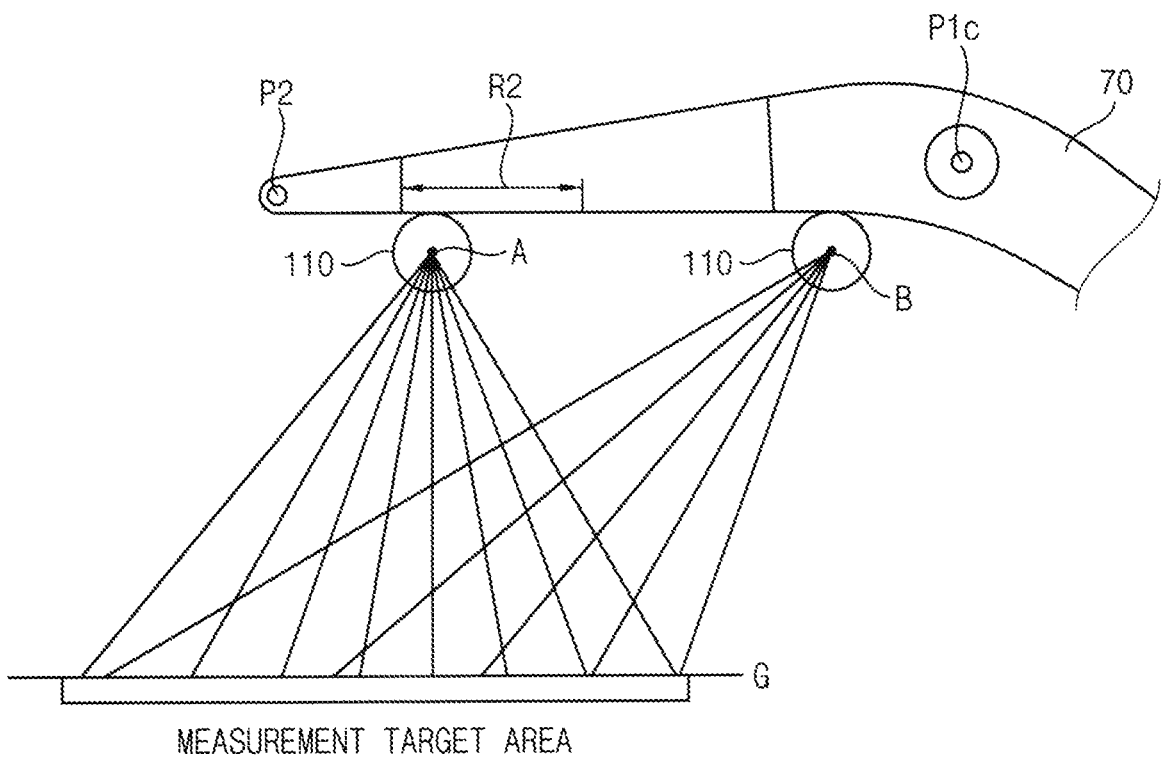
FIG. 4 is a side view illustrating a difference in resolution according to the installation location of the second sensor.

FIG. 3 is a side view illustrating an installation location of a second sensor in accordance with example embodiments. FIG. 4 is a side view illustrating a difference in resolution according to the installation location of the second sensor.

Referring to FIG. 3, an installation location of a second sensor 110 may be determined in consideration of interference between a boom 70, an arm 80, and a bucket 90 and an incident angle of a laser with respect to the ground of the second sensor 110.

In example embodiments, the second sensor 110 may be installed in a region R2 that does not overlap a trajectory of a circle Cb drawn by an end P4 of the bucket 90, with the arm 80 folded as far as possible.

First, in order to check the interference with the front working device (boom, arm, bucket), it may be assumed that the arm 80 is folded all the way so that the possibility of interference is greatest based on the LiDAR size (thickness T). The trajectory Cb of a circle of a bucket tooth P4 may be drawn as the bucket 90 moves around a bucket pin P3. A space created between the boom 70 and the trajectory Cb of the bucket tooth P4 may be a space in which the LiDAR is to be installed. According to the size of the LiDAR, the space may be divided into a space (OR) where the interference occurs and a space where the interference does not occur.

As illustrated in FIG. 3, when the coordinate of the bucket pin (rotation center point) P3 and the rotation radius rb of the bucket are determined, a surface on which the LiDAR is to be installed may be determined to be a section in which the lower surface of the boom 70 is kept flat, that is, the surface between the starting point (a) and the end point (d). If a thickness (T) of the LiDAR is determined, the intersection points (c, d) at which the trajectory Cb of the circle crosses the installation space (P) formed when the LiDAR moves along the installation surface R1 may be determined. From this, an interference space OR may be obtained by finding the positions of the intersection points (c, d) using the equation of the secant of the circle. Thus, the interference-free region R2 may be determined as the installation area by excluding the interference space OR from the installation surface R1.

Then, where to optimize resolution may be determined within the interference-free region. The second sensor 110 may be installed in a region relatively close to a female pin P2 in the interference-free region R2.

FIG. 4 represents a difference in measurement resolution with respect to a measurement target area according to the installation position of the LiDAR. Since the LiDAR detects while an internal laser module rotates, the LiDAR may obtain samples at regular angular intervals. Accordingly, as an installation angle of the LiDAR with respect to the ground decreases (as it is installed obliquely), a distance between the measured samples increases, so that the resolution may decrease. In FIG. 4, when the LiDAR is installed at point A relatively close to the female pin P2, the resolution can be relatively improved by acquiring 8 samples, on the other hand, when the LiDAR is installed at point B relatively close to a boom center pin Plc, the resolution may be relatively degraded by acquiring five samples.

Therefore, the LiDAR may be installed as vertically as possible. That is, the LiDAR may be installed as close to the arm 80 as possible on the installation surface R1. However, as the LiDAR approaches the arm, there is a disadvantage of having to lift the arm 80 and the bucket 90 when measuring the ground at a distance. Therefore, the LiDAR may be basically installed close to the arm 80, but it may be determined to move the installation position toward the boom center pin Plc according to the FOV specification of the LiDAR.

The data processing device 200 may collect and process data from the first and second sensors to provide surrounding environment data of the construction machinery. The data processing device 200 may be implemented with dedicated hardware, software, and circuitry configured to perform the functions described herein. The data processing device may be physically implemented by electronic circuits such as logic circuits, discrete components, microprocessors, hard-wired circuits, memory elements, wiring connections, and the like.

The data processing device 200 may process the acquired PCD information into data having surface properties. Points in the area around the excavator may be converted into data having surface properties through a post-processing operation. For example, the PCD points may be reconstructed with uniform grid spacing through interpolation, and the points may be connected in a triangular shape through a Triangulated Irregular Networks (TIN) algorithm, and each triangle may become one surface data. The surface data (topographic information data of an area of interest) may be used as topographic data for determining topographic characteristics and establishing an excavation plan.

As mentioned above, the environment recognition system for an unmanned or automated excavator may include a plurality of LiDAR sensors which are arranged to secure a required viewing angle in the process of acquiring topographic information around the excavator and implementing a function to detect surrounding objects. In particular, the LiDAR sensor may be arranging at an optimal position on the lower surface of the boom 70, to minimize damages of the sensor due to the movement of the front working device 60 and improve the resolution of the ground measurement to an optimal state, thereby ensuring the efficiency and accuracy of the excavation work.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. An environment cognition system for construction machinery, comprising:
    a first sensor installed on an upper surface of a cabin of the construction machinery to obtain shape information on a front ground; and
    a second sensor installed on a lower surface of a boom of the construction machinery to obtain shape information data in an excavation area,
    wherein the second sensor is installed in a region that does not overlap a trajectory of a circle drawn by an end of a bucket, with an arm folded as far as possible,
    wherein the first and second sensors comprise a LiDAR (Light Detection And Ranging) sensor, and
    wherein in response to a thickness of the LiDAR sensor being determined, intersection points at which the trajectory crosses an installation space formed when the LiDAR sensor moves along an installation surface on which the LiDAR sensor is to be installed are determined, an interference space is obtained by finding positions of the intersection points using an equation of a secant of the circle, and an interference-free region is determined as the installation region by excluding the interference space from the installation region.

2. The environment cognition system for construction machinery of claim 1, wherein the second sensor is installed in the region close to a pin of the arm in the region.

3. The environment cognition system for construction machinery of claim 1, further comprising:
    a data processing device configured to collect and process data from the first and second sensors to provide surrounding environment data of the construction machinery.

* * * * *